(12) United States Patent
Chivers

(10) Patent No.: US 9,950,388 B2
(45) Date of Patent: Apr. 24, 2018

(54) METHOD OF PRODUCING AN INTEGRALLY BLADED ROTOR FOR A TURBOMACHINE

(71) Applicant: ROLLS-ROYCE PLC, London (GB)

(72) Inventor: Nigel James David Chivers, Chippenham (GB)

(73) Assignee: ROLLS-ROYCE plc, London (GB)

( * ) Notice: Subject to any disclaimer, the term of this patent is extended or adjusted under 35 U.S.C. 154(b) by 193 days.

(21) Appl. No.: 14/943,675

(22) Filed: Nov. 17, 2015

(65) Prior Publication Data

US 2016/0175983 A1 Jun. 23, 2016

(30) Foreign Application Priority Data

Dec. 17, 2014 (GB) .................................. 1422441.4

(51) Int. Cl.
*B23K 26/00* (2014.01)
*B23K 26/342* (2014.01)
(Continued)

(52) U.S. Cl.
CPC ............ *B23K 26/0093* (2013.01); *B22F 5/04* (2013.01); *B23K 26/144* (2015.10); *B23K 26/342* (2015.10); *B23P 15/006* (2013.01); *F01D 5/147* (2013.01); *F01D 5/34* (2013.01); *B22F 2998/10* (2013.01); *B23K 2201/001* (2013.01);
(Continued)

(58) Field of Classification Search
CPC .......................... B23K 26/0093; B23K 26/144; B23K 26/342; B22F 5/04; F01D 5/34; F01D 5/147; B23P 15/006; F05D 2230/31
See application file for complete search history.

(56) References Cited

U.S. PATENT DOCUMENTS 6,269,540 B1 8/2001 Islam et al.
2005/0271512 A1* 12/2005 Mielke ................ C21D 9/0025
416/234
(Continued)

FOREIGN PATENT DOCUMENTS

DE 102013205956 A1 10/2014
EP 1637274 A1 3/2006
(Continued)

OTHER PUBLICATIONS

Jun. 23, 2016 Extended Search Report in European Patent Application No. 15194857.7.
(Continued)

*Primary Examiner* — Moshe Wilensky
(74) *Attorney, Agent, or Firm* — Oliff PLC

(57) ABSTRACT

There is proposed a method of producing an integrally bladed rotor, preferably a so-called "blisk" for a turbomachine, the method including the steps of: providing a rotor disc having a plurality of spaced-apart radial protrusions formed integrally around its perimeter; and forming a respective aerofoil-shaped blade extending radially generally outwardly from each of the protrusions via laser deposition. Each protrusion preferably extends radially outwardly from a circumferential body part of the rotor disc by a distance which is greater than the radially inward penetration of a heat-affected zone arising from the laser deposition used to form the respective blade.

9 Claims, 4 Drawing Sheets

(51) Int. Cl.
    *B23K 26/144*    (2014.01)
    *B23P 15/00*    (2006.01)
    *B22F 5/04*    (2006.01)
    *F01D 5/14*    (2006.01)
    *F01D 5/34*    (2006.01)
    *F01D 5/18*    (2006.01)
    *B23K 101/00*    (2006.01)
    *B23K 103/14*    (2006.01)
    *B23K 103/18*    (2006.01)
    *F01D 5/30*    (2006.01)

(52) U.S. Cl.
    CPC ...... *B23K 2203/14* (2013.01); *B23K 2203/26* (2015.10); *F01D 5/18* (2013.01); *F01D 5/3061* (2013.01); *F05D 2230/31* (2013.01); *Y02P 10/295* (2015.11)

(56) References Cited

U.S. PATENT DOCUMENTS

2007/0007260 A1   1/2007   Steinhardt
2012/0148413 A1   6/2012   Richter et al.
2014/0163717 A1*  6/2014   Das ................ B22F 3/1055
                                                                          700/119

FOREIGN PATENT DOCUMENTS

GB          2228224 A     8/1990
WO    2006/026962 A1   3/2006

OTHER PUBLICATIONS

Oct. 8, 2015 Search Report in Great Britain Patent Application No. 1422441.4.

* cited by examiner

METHOD OF PRODUCING AN INTEGRALLY BLADED ROTOR FOR A TURBOMACHINE

The present invention relates to a method of producing an integrally bladed rotor for a turbomachine, and more particularly relates to such a method involving laser deposition. It is envisaged that the method will be particularly suitable for the production of an integrally bladed disc for a gas turbine engine.

A gas turbine engine conventionally draws in and compresses air by directing the air through an axial flow compressor, after which the compressed air is mixed with fuel and the resulting mixture is burned in a combustor, before the combustion products are then expelled through an axial flow turbine which drives the compressor. The compressor typically comprises a rotor drum which is assembled from a number of rotor discs which are joined to one another, and each of which has a plurality of aerofoil-shaped rotor blades projecting from its periphery.

Traditionally, compressor discs have been produced by forging a disc body with slots provided around its periphery, and by separately casting or forging the individual rotor blades such that each has a root section called a "dovetail" that fits into a respective slot in the disc body. Assembly is completed by sliding the dovetail sections of the blades into the slots in the disc body.

More recently, it has become common to form the rotor blades integrally with the disc body, with discs of this type becoming known commonly as "blisks". Blisks offer improved performance by virtue of their reduced weight. Blisks can be forged as a large disc with excess metal around their peripheral region, whereupon the individual blades can be machined from the excess metal such that they form an integral part of the disc. Alternatively, it is possible to bond separately formed blades to the periphery of a forged disc, for example by linear friction welding, although even in this type of method there is generally required an excess of metal around the foot of each blade which will need to be subsequently machined away. In either case, the resulting disc has no mechanical fixtures such as the afore-mentioned slot and dovetail arrangement.

Whilst the known techniques of producing blisks described above are advantageous over traditional techniques, it is perceived that further benefits could be obtained if the blades could be formed by an additive layer manufacturing technique such as laser deposition.

It is therefore an object of the present invention to provide an improved method of producing an integrally bladed rotor for a turbomachine.

It is to be appreciated, however, that the method of the present invention is not restricted to the production of blisks for compressors in gas turbine engines, and could also be used to produce other types of integrally bladed rotors for gas turbine engines or turbomachines more generally.

According to the present invention, there is provided a method of producing an integrally bladed rotor for a turbomachine, the method comprising the steps of: providing a rotor having a plurality of spaced-apart radial protrusions formed integrally around its periphery; and forming a respective aerofoil-shaped blade extending generally radially outwardly from each said protrusion via laser deposition. It is envisaged that the method may be used to produce an integrally bladed rotor disc of a type commonly known as a "blisk".

Preferably, each protrusion extends radially outwardly from a circumferential body part of the rotor by a distance which is greater than the radially inward penetration of a heat-affected zone arising from said laser deposition used to form the respective blade.

Conveniently, each blade is formed so as to be substantially hollow.

Optionally, said step of providing the rotor includes the steps of providing a rotor blank and then machining the rotor blank to form said rotor with integrally formed protrusions.

Said rotor blank may be forged.

Preferably, said step of forming each blade involves building-up the blade from a plurality of successive layers of material, each layer defining a respective cross-section of the blade and being formed by a respective deposition of molten material created by melting a powder with a laser beam, wherein a first said layer is formed by depositing said molten material directly on said protrusion, and each subsequent layer is formed by depositing said molten material on the immediately preceding layer.

Advantageously, said step of forming each blade involves building-up the blade in a generally radially outwards direction, and said first layer is formed by depositing said molten material directly on a radially outwardly directed surface of said protrusion, Conveniently, said step of forming each blade involves the formation of at least some of said layers in the shape of a closed boundary within which there is defined a respective cross-section of an internal void of the hollow blade.

Optionally, each said protrusion is formed in a configuration having a radially outwardly directed surface in the shape of a closed boundary on which said molten material is deposited to form the first layer of the respective blade.

Advantageously, said step of forming each blade via laser deposition is performed in an inert atmosphere.

Optionally, said rotor with integrally formed protrusions is made of titanium or a titanium alloy. Alternatively, it is envisaged that in some embodiments the rotor with integrally formed protrusions may be made from nickel or a nickel alloy.

Conveniently, each said blade is formed from titanium or a titanium alloy. Alternatively, each blade may be formed from nickel or a nickel alloy.

The present invention may be embodied in a method for producing an integrally bladed rotor for a gas turbine engine. The rotor may be provided in the form of a so-called "blisk".

So that the invention may be more readily understood, and so that further features thereof may be appreciated, embodiments of the invention will now be described by way of example with reference to the accompanying drawings in which.

Figure 1:
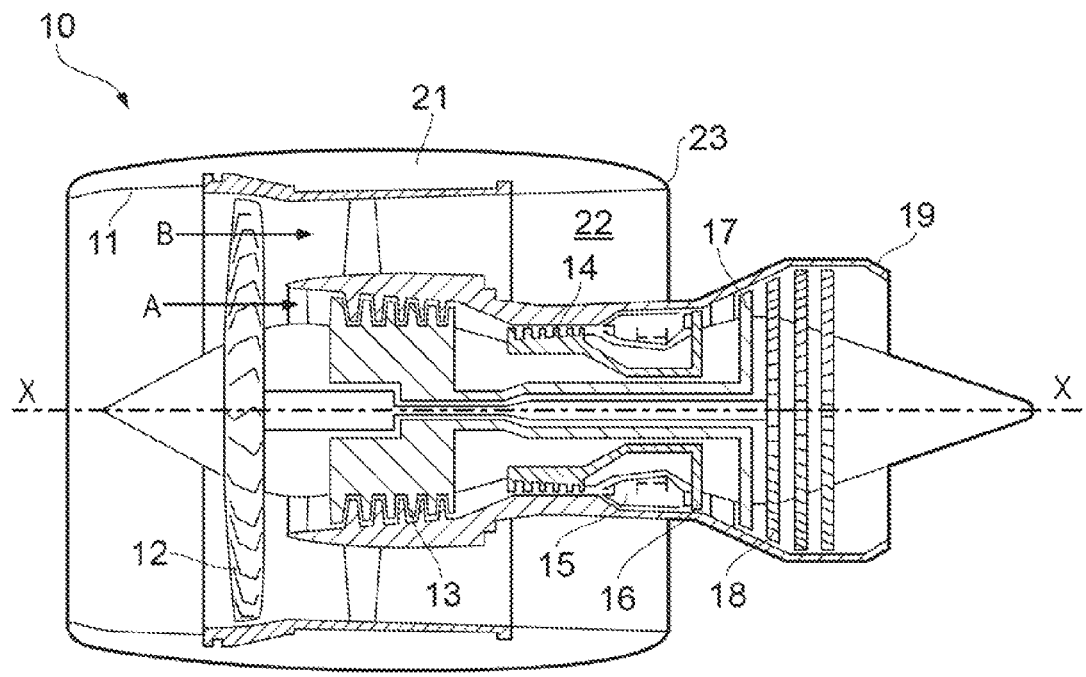
FIG. 1 is longitudinal sectional view through a gas turbine engine.

With reference to FIG. 1, a ducted fan gas turbine engine is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

Figure 2:
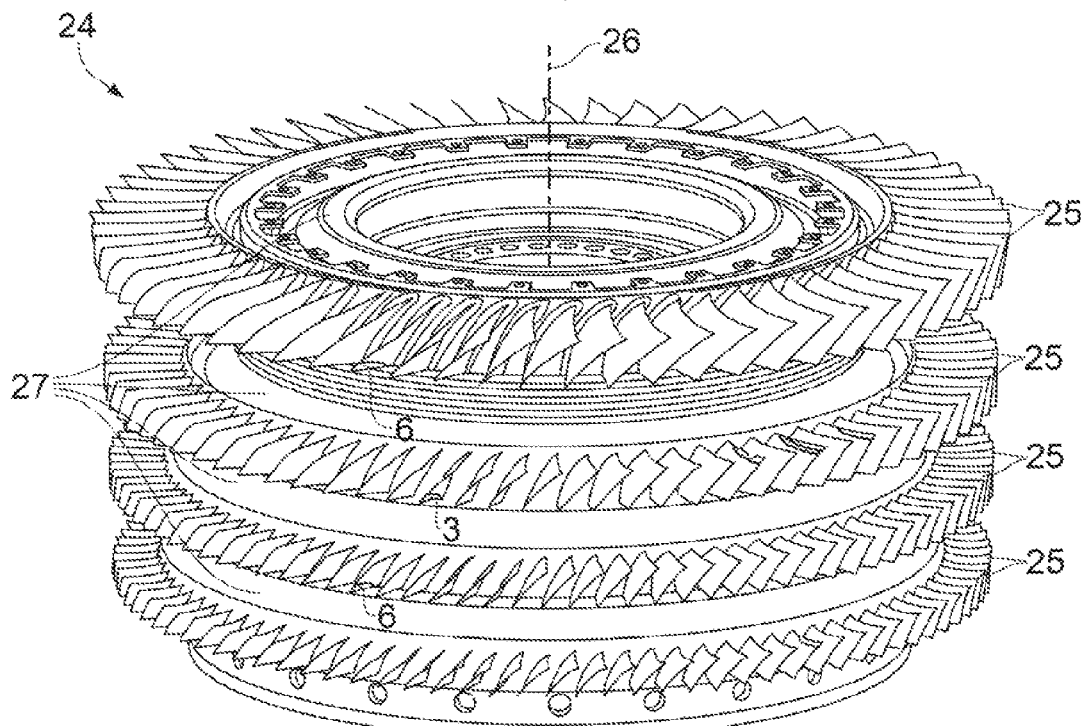
FIG. 2 is a perspective view showing a compressor drum of the engine, which comprises a series of rotor discs.

As will be appreciated by those of skill in the art of turbomachinery, the intermediate and high pressure compressors 13, 14 each comprise a compressor rotor which is rotatable at high speed by the respective shaft, and which has a plurality of generally radially outwardly extending compressor blades of aerofoil configuration provided around its periphery. FIG. 2 illustrates schematically one such compressor rotor.

The particular compressor rotor illustrated in FIG. 2 takes the form of a four-stage compressor drum 24, which is so-called because it has four discrete rows of blades 25, the rows of blades being axially spaced from one another in the direction of the drum's rotational axis 26. The drum 24 actually comprises four discrete rotor discs 27, which are firmly connected to each other and each of which carries a respective row of blades 25. The blades 25 are formed integrally around the outer circumference of each disc in accordance with the method of the present invention and as will be described in more detail below.

Figure 3:
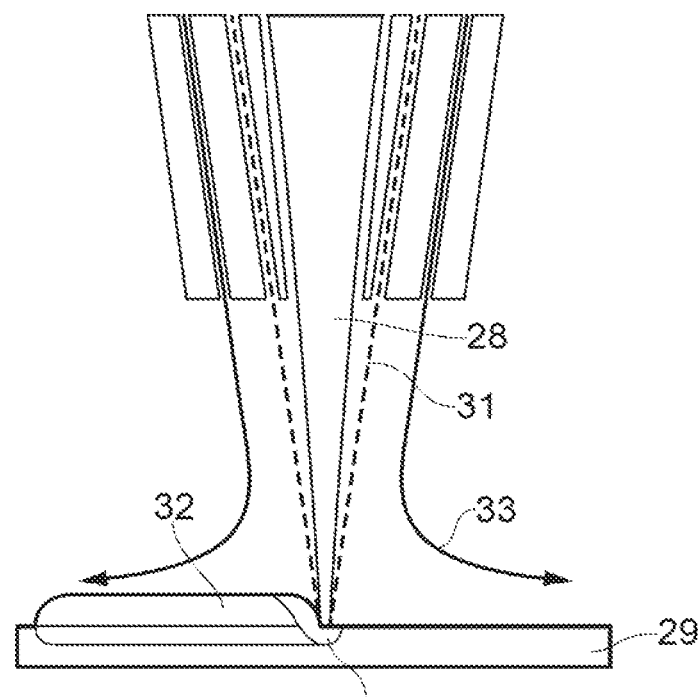
FIG. 3 is a schematic drawing showing an exemplary laser deposition technique which may be used in the method of the present invention.

It is envisaged that the blades 25 will each be formed via laser deposition. FIG. 3 illustrates an exemplary laser metal deposition technique and arrangement. As will be appreciated, in simple terms laser metal deposition involves the use of a high energy laser beam 28 which is focussed on a metallic substrate 29 to form a melt pool 30 on the substrate. Metal, such as titanium or titanium alloy, in fine powder form 31 is fed into the melt pool 30, whereupon the metal powder 31 will melt and form a deposit 32 that is fusion bonded to the substrate and which remains after the laser beam 28 has been moved away from the work area. FIG. 3 illustrates a laser deposition technique in which the fine metal powder 31 is directed towards the melt pool 30 in a conical stream extending around the laser beam 28, although it is to be appreciated that the metal powder can be directed towards the melt pool in other ways. FIG. 3 also illustrates a shielding stream of inert gas 33 which can be directed towards the substrate around the outside of the powder stream 31 to help constrain the powder stream 31 and protect the melt pool 30 from the atmosphere. However it is to be noted that this type of shielding gas stream may be omitted in embodiments of the present invention.

Figure 4:
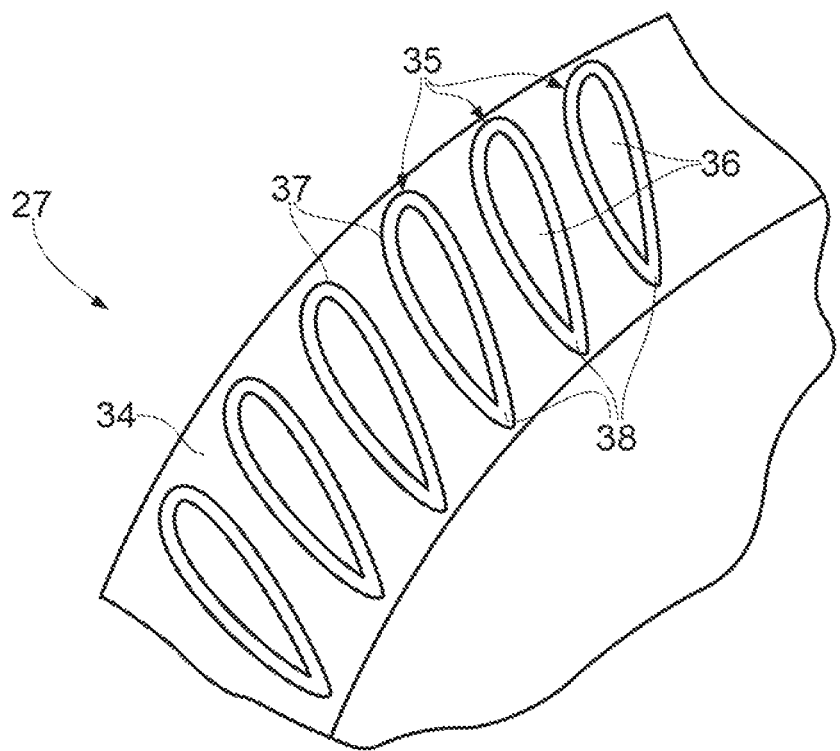
FIG. 4 is a schematic perspective view showing part of a rotor, having a series of integral protrusions around its periphery.
Figure 5:
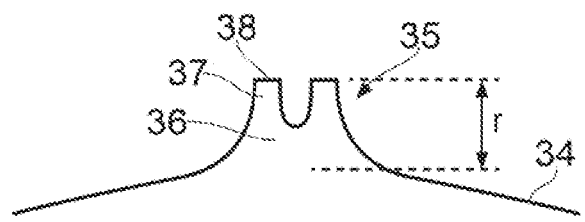
FIG. 5 is a cross-sectional view showing part of the rotor in FIG. 4 and a single protrusion.

FIGS. 4 and 5 each show part of a rotor disc 27, and in particular show a peripheral region of a circumferential body part 34 of the rotor disc 27. As will be noted, the rotor disc 27 is provided with a plurality of circumferentially spaced apart protrusions 35 around its periphery. As illustrated most clearly in FIG. 5, each protrusion 35 is formed as an integral part of the rotor disc 27, and protrudes from the circumferential body part 34 of the rotor 27 in a radially outwards direction. Furthermore, it will be noted that each protrusion comprises a main region 36 which supports a radially outwardly directed peripheral wall 37. Each peripheral wall 37 follows a path defining the shape of a root portion of a respective rotor blade, and presents a generally planar radially outwardly directed surface 38 in the shape of a closed boundary. As will be explained below in more detail, the surface 38 of each protrusion will accept an initial deposit of material via laser deposition in order to build up a respective rotor blade on the protrusion.

As shown in FIG. 5, each protrusion 35 extends radially outwardly from the circumferential body 34 of the rotor disc 27 by a distance r.

It is proposed that the rotor disc 27 with its integrally formed protrusions 35 will be formed from a forged rotor blank (not shown). The rotor blank may be forged from titanium or a titanium alloy, and will have a radius substantially equal to, or greater than, the total radial dimension of each protrusion. The peripheral region of the rotor blank may then be machined in order to remove excess material around its periphery and thereby create the protrusions 35 as integral features of the resulting rotor disc 27.

Following the formation of the rotor disc 27 with its integral protrusions as described above, a respective rotor blade 25 will then be formed on each protrusion 35 such that the blade 27 will extend generally radially outwardly from the protrusion. An initial step in the formation of a rotor blade 25 on its respective protrusion 35 is illustrated schematically in FIG. 6.

Figure 6:
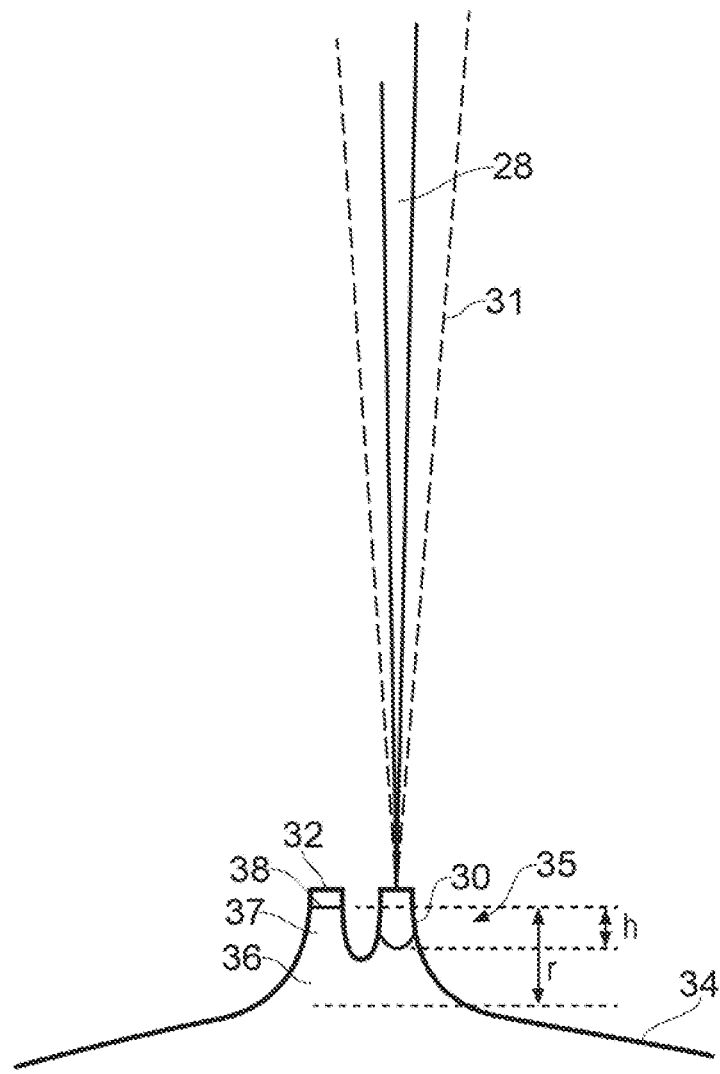
FIG. 6 is a view similar to that of FIG. 5, but which shows an initial layer of material being deposited on a protrusion via a laser deposition technique to form a rotor blade.

It is proposed to build up each rotor blade 25 from a plurality of successive layers of material (preferably titanium or titanium alloy) deposited via a laser deposition technique carried out in an inert atmosphere, such that each layer will define a respective radial cross-section of the blade 25. FIG. 6 illustrates the formation of a first layer of material 32 directly on the outer surface 38 of a protrusion 35. As illustrated, the high energy laser beam 28 is focussed on the surface 38 of the protrusion to form a melt pool 30 in the material of the protrusion, into which finely powdered material 31 (preferably titanium or a titanium alloy as mentioned above) is directed. The powdered material 31 thus melts. As will be appreciated, the focus point of the laser beam 28 is scanned over and around the upper surface 38 of the protrusion to form a deposit of material defining the first layer 32 all of the way around the protrusion.

It is important to note from FIG. 6, that the heat-affected zone arising from the formation of the melt pool 30 in the protrusion extends radially inwardly from the upper surface 38 of the protrusion by a distance h, which is significantly less than radial extent r of the protrusion 35. The protrusion thus prevents the heat-affected zone arising from the deposition of the first layer of material 32 from penetrating the circumferential body 34 of the disc 27 which carries critical hoop stresses during high-speed rotation within the engine 10, thereby ensuring the integrity of the circumferential body part 34 is unaffected by the laser deposition process.

Figure 7:
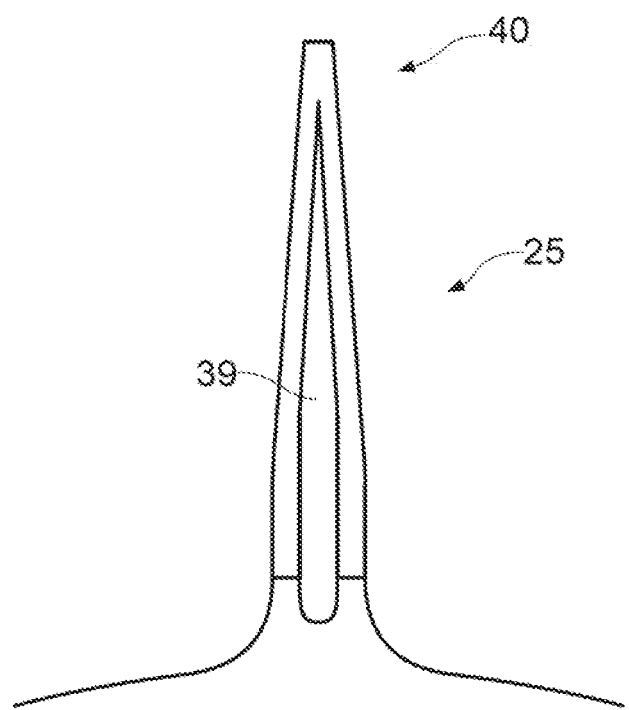
FIG. 7 is a view similar to that of FIG. 6, but which shows a substantially complete rotor blade formed via laser deposition.

Following the formation of the first layer 32 a subsequent layer of material will then be deposited on the first layer 32, with subsequent layers then being deposited on the immediately preceding layer to gradually build up the rotor blade 25 in a radial direction. A desired shape to the rotor blade 25 can be achieved by offsetting some of the layers relative to their immediately preceding layers, as will be appreciated by those of skill in the art of laser deposition. As will be appreciated, the laser beam 28 may be accurately controlled by computer to ensure proper formation and relative positions of the successive layers As will be appreciated from FIG. 6, the first layer 32 of material deposited directly on the outer surface 38 of the protrusion 35 follows the path of the outer surface, and so will take the shape of a closed boundary. Subsequent layers will also follow a closed boundary, such that a hollow rotor blade 25 will be built up, as illustrated schematically in FIG. 7, the blade 25 having an internal void 39.

As will be appreciated, the radially outermost tip region 40 of the blade 25 will be created by depositing layers of material which gradually converge until the last few layers will no longer be deposited in the shape of a closed boundary but will instead follow the path of respective strips to define the tip of the blade 25.

Because it is envisaged that the laser deposition formation of the blades 25 will be carried out in an inert atmosphere, the formation of the last few layers of material to form the tips 40 of the blades will be effective to seal the internal voids 39 of the hollow blades whilst the rotor 27 is still inside the inert atmosphere. The internal void 39 of each blade 25 will therefore contain entrapped inert gas, which will help to avoid alpha rich grain development inside the rotor blades 25 during subsequent heat treatment of the rotor 27 as might be necessary.

Alternatively, however, it is envisaged that in other embodiments the voids 39 could be sealed by creating a separate electron beam weld at the tip 40 of each blade 25, after the bulk of each blade has been formed by the above-described laser deposition technique. In this case, it is envisaged that the sealing electron beam welds will be created whilst the rotor 27 is located in a vacuum to prevent oxygen becoming trapped within the voids 39, which will provide similar protection against alpha rich grain development during subsequent heat treatment.

It is envisaged that after forming the rotor blades 25 as described above, the external surfaces of the rotor blades may be machined and polished to provide a suitably smooth aerodynamic surface.

Whilst the present invention has been described above with reference to specific embodiments, it is envisaged that various changes or modifications could be made without departing from the scope of the present invention. For example, it is envisaged that in some embodiments the laser deposition technique could be used to create thin supporting webs or suchlike extending across the internal voids 39 of the blades 25. It is envisaged that this may be particularly appropriate when forming relatively large blades in order to prevent undesirably twist or other deflection of the blades during operation of the rotor inside an engine.

Furthermore, whilst the invention has been described above with specific reference to an embodiment used to form hollow rotor blades 25 from titanium or titanium alloy, it is envisaged that in alternative embodiments nickel or nickel alloy could be used instead. For example, it is envisaged that rotor blades 25 formed from a nickel alloy, and which may be solid rather than hollow, may be suitable for use in the relatively hot downstream region of an engine's compressor section. In such a method, the protrusions 35 on which the rotor blades are formed may also be formed or nickel or a nickel alloy.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of producing an integrally bladed rotor for a turbomachine, the method comprising the steps of:
providing a rotor having a plurality of spaced-apart radial protrusions formed integrally around its periphery; and
forming a respective aerofoil-shaped blade extending generally radially outwardly from each said protrusion via laser deposition,
wherein the step of forming each blade involves building-up the blade from a plurality of successive layers of material, each layer defining a respective cross-section of the blade and being formed by a respective deposition of molten material created by melting a powder with a laser beam, wherein a first said layer is formed by depositing said molten material directly on said protrusion, and each subsequent layer is formed by depositing said molten material on the immediately preceding layer,
wherein each blade is formed so as to be substantially hollow, and said step of forming each involves the formation of at least some of said layers in the shape of a closed boundary within which there is defined a respective cross-section of an internal void of the hollow blade, and
wherein each said protrusion is formed in a configuration having a radially outwardly directed surface in the shape of a closed boundary on which said molten material is deposited to form the first layer of the respective blade.

2. A method according to claim 1, wherein each protrusion extends radially outwardly from a circumferential body part of the rotor by a distance which is greater than the radially inward penetration of a heat-affected zone arising from said laser deposition used to form the respective blade.

3. A method according to claim 1, wherein said step of providing the rotor includes the steps of providing a rotor blank and then machining the rotor blank to form said rotor with integrally formed protrusions.

4. A method according to claim 3, wherein said rotor blank is forged.

5. A method according to claim 1, wherein said step of forming each blade involves building-up the blade in a generally radially outwards direction, and said first layer is formed by depositing said molten material directly on a radially outwardly directed surface of said protrusion.

6. A method according to claim 1, wherein said step of forming each blade via laser deposition is performed in an inert atmosphere.

7. A method according to claim 1, wherein said rotor with integrally formed protrusions is made of titanium or a titanium alloy.

8. A method according to claim 1, wherein each said blade is formed from titanium or a titanium alloy.

9. A method according to claim 1 for producing an integrally bladed rotor for a gas turbine engine.

* * * * *